United States Patent [19]
Carlo

[11] 4,370,897
[45] Feb. 1, 1983

[54] DUAL MODE SHIFTER FOR AUTOMATIC TRANSMISSIONS

[75] Inventor: Louis D. Carlo, Litchfield, Ohio

[73] Assignee: American Industries, Inc., Cleveland, Ohio

[21] Appl. No.: 189,430

[22] Filed: Sep. 22, 1980

[51] Int. Cl.³ .......................... G05G 7/06; G05G 9/06
[52] U.S. Cl. ........................................ 74/475; 74/142; 74/473 R; 74/476
[58] Field of Search ...................... 74/473 R, 475, 476, 74/142

[56] References Cited
U.S. PATENT DOCUMENTS

| | | | |
|---|---|---|---|
| 3,665,775 | 5/1972 | Freeman | 74/142 X |
| 3,800,614 | 4/1974 | Johnson | 74/473 R |
| 3,941,008 | 3/1976 | Cambria | 74/475 |
| 4,084,448 | 4/1978 | Wolfe | 74/475 |

*Primary Examiner*—Allan D. Herrmann
*Attorney, Agent, or Firm*—Browdy & Neimark

[57] ABSTRACT

A shifter having a true ratchet mode for operating between the drive gears, and a gate mode for use in park and reverse. The invention provides a floating pawl at the ends of two links in a three member, four pivot point linkage. This linkage provides the advantages that the operating handle is always engaged and yet permits easy change-over from one mode to the other.

44 Claims, 10 Drawing Figures

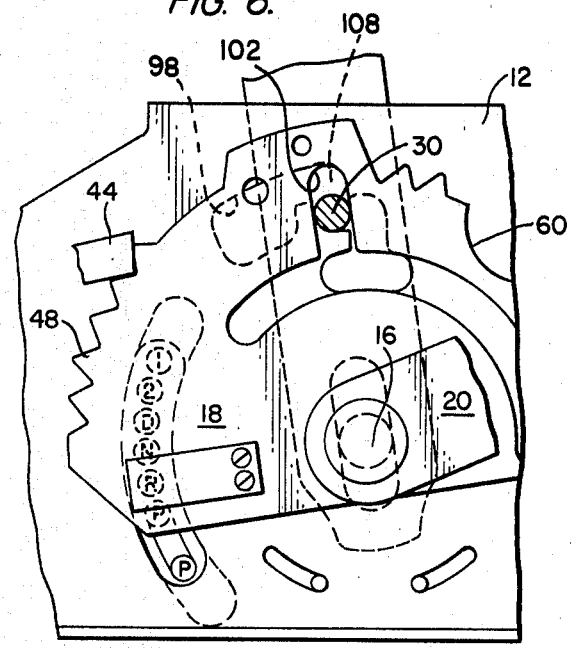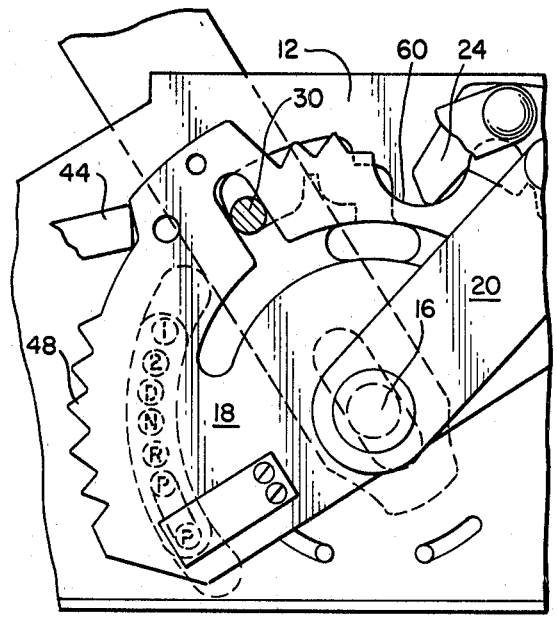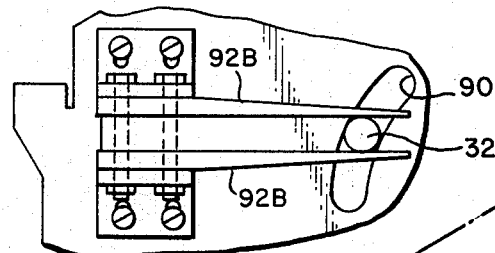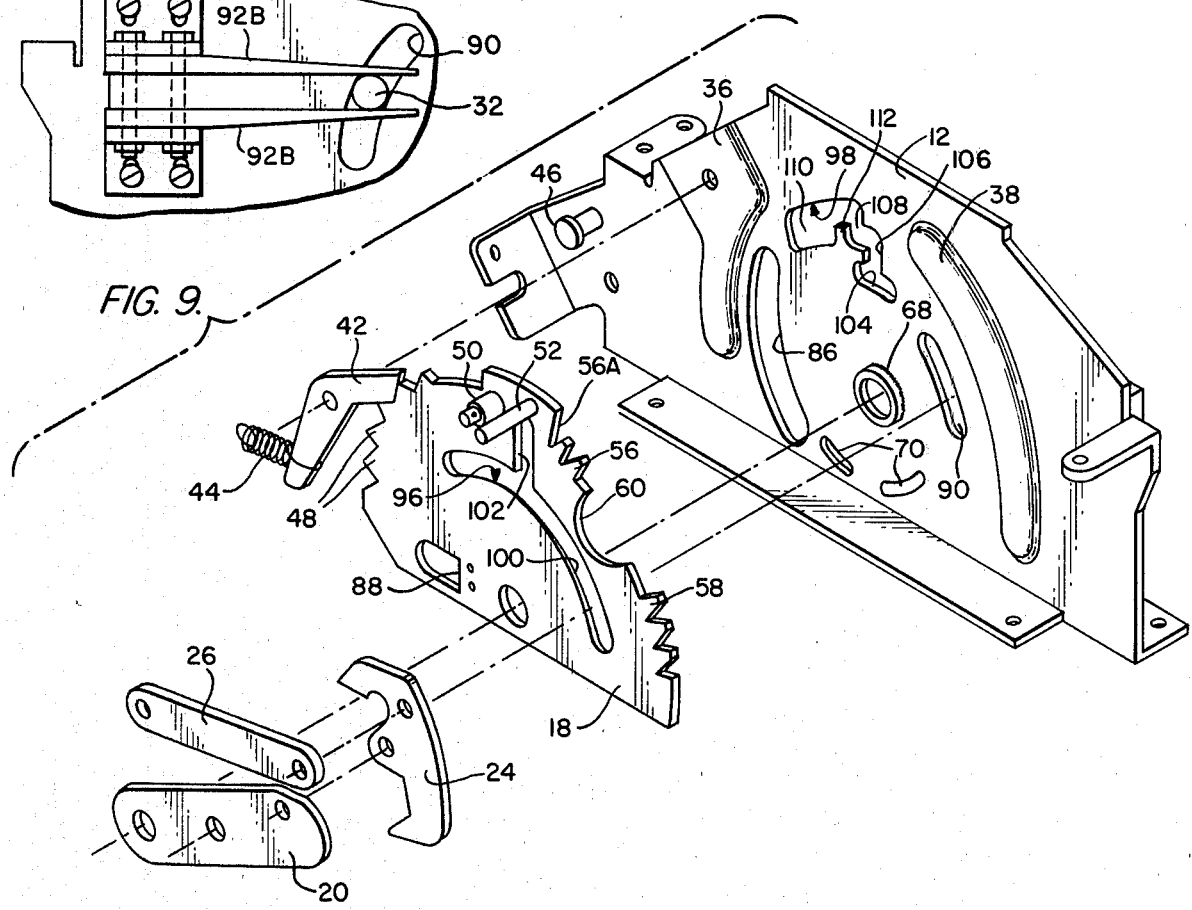

DUAL MODE SHIFTER FOR AUTOMATIC TRANSMISSIONS

The present invention pertains to automotive shifters, particularly shifters for automatic transmissions, and more particularly such shifters for use in "drag races", more serious racing, and for ordinary street use.

The invention provides a dual mode shifter wherein a true ratchet action is provided between neutral and the two or three forward gears in the transmission being controlled by the invention shifter. The second mode of operation involves a gate action which operates between neutral, reverse and park. It is necessary to raise the handle of the shifter when in neutral in order to get access between the ratchet mode for the drive ranges and the gate mode controlling reverse and park. This is an important advantage, that is, the elimination of accidental motion into reverse or park during racing. Such an accident would of course be disastrous for the car and possibly for the driver as well.

Further, the invention shifter provides direct access to and from neutral from both modes, a feature of versatility not available in some prior art shifters.

As used in the specification and claims herein, the terms "ratchet", "ratchet mode", and the like, based on the standard dictionary definition, shall be understood to mean a mechanism wherein the manually operated handle has a home position and is free to rock to and fro away from that home position to thus operate the shifter and hence the transmission through its gears; the mechanism also including spring means to bias the handle to this normal home position, and further including a pawl and cooperating ratchet teeth to obtain the motion.

Pure ratchet shifters are well known in the art; see U.S. Pat. Nos. 3,665,775 to Freeman and 3,800,614 to Johnson. Similarly, straight gate type shifters are also known in the art, see U.S. Pat. No. 4,118,999 to Beiber for a gate type shifter for an automatic shifter.

Hybrid shifters such as the present invention are not so well known in the art. A somewhat pertinent patented structure can be found in Cambria U.S. Pat. No. 3,941,008 wherein the handle 28 moves progressively from one shift position to another, and the device includes a ratchet comprising a pawl 126 and teeth 104 and 102. However, the purpose of this ratchet is to prevent the handle from progressing more than one gear position at a time, a momentary release being required to permit progression from one position to the next position. Thus, the ratchet in Cambria is used as stop means to prevent overshifting, rather than to directly shift the transmission as is done in the present invention. In summary, to fully differentiate from Cambria, the ratchet of the invention operates the transmission directly rather than indirectly as a stop means as in Cambria.

The prior art also includes dual mode shifters for automatic transmissions wherein the ratchet means includes a split pawl. Another such negative feature is a handle which is completely disengaged from the ratchet pawl when it moves out of ratchet mode into gate mode.

Both these features have disadvantages as compared to the present invention. When lifting the handle away from the ratchet pawl, be it a single or a split pawl, problems could be encountered in later relocating the pin or other means on the handle with the pawl. This is alleviated in the invention in that the handle is always engaged at a permanent pivot point between the pawl and the handle.

The split pawl feature is less desirable than the unitary pawl member of this invention. A split pawl doubles the possibility of failure as there are two pawl members. Further, manufacture, costs, and assembly are needlessly complicated because the "pawl" thus comprises an assembly of several members, each separately pivoted on separately mounted pivot means, and often including spring means on the pawl members themselves in order to operate with the ratchet teeth.

This same split pawl prior art shifter does not have the ability to move directly from neutral to the gate mode. In that prior shifter, the user must move into drive to disengage the ratchet mode, and then can move to gate mode. This is less convenient than the direct access from neutral from either mode as is done in the invention.

Another feature and advantage over the prior art is the provision of electrical switch means incorporated into the assembly of the shifter itself for operating remote readout means. That is, the switch means can operate an array of lights in a remote readout which can take any suitable configuration and can be mounted at any desired location on the vehicle to indicate the gear position of the shifter. Such remote readouts can be placed on the hood or at other locations easily visible to the driver while racing.

The invention provides an apparatus of the character described comprising a three-member linkage having four pivot points. The first pivot point is on the main frame and carries the handle the ratchet plate, and a radius link extending out to the "floating" pawl. The connection between the radius link and the pawl is the second pivot. The third pivot is between the pawl and a connecting link, the other end of which is pivoted at the fourth point to the handle at a position thereon spaced from the first pivot. This linkage permits the ratchet motion and the gate motion for the two different modes of operation of the invention.

The motion of the linkage is synchronized for proper pawl operation by leaf springs which bear on a pin carried by the radius link. Three different forms of this leaf spring are disclosed.

The invention also provides two multi-purpose springs, each of which performs dual functions as compared to the prior art where separate springs are provided for each function. This, quite obviously, reduces cost both from the parts and from the assembly viewpoints as well as providing advantages as to reliability and simplicity of manufacture. These two are the torsion spring which biases the handle to home and also secures the handle in the down or ratchet position; and the leaf springs which synchronize linkage operation and also help the handle motion.

The invention comprises an improved spring means which biases the handle always to its home position to achieve true ratchet operation, and which aids in biasing the ratchet plate back towards neutral when moving out of park and into reverse position.

The present invention also provides an apparatus of the character described which is extremely tough for durable use, which is made of simple stamped parts so that great economies of manufacture are realized, and which is yet highly efficient and practical for its intended use.

The above and other advantages of the invention will be pointed out or will become evident in the following detailed description and claims, and in the accompanying drawing also forming a part of the disclosure, in which:

FIGS. 5, 6 and 7 are a series of "action" views from the handle side showing the shifter in different positions;

FIG. 8 is a fragment view of another form of the biasing spring means for the radius link;

FIG. 9 is an exploded perspective view of the shifter and FIG. 1; and

Figure 1:
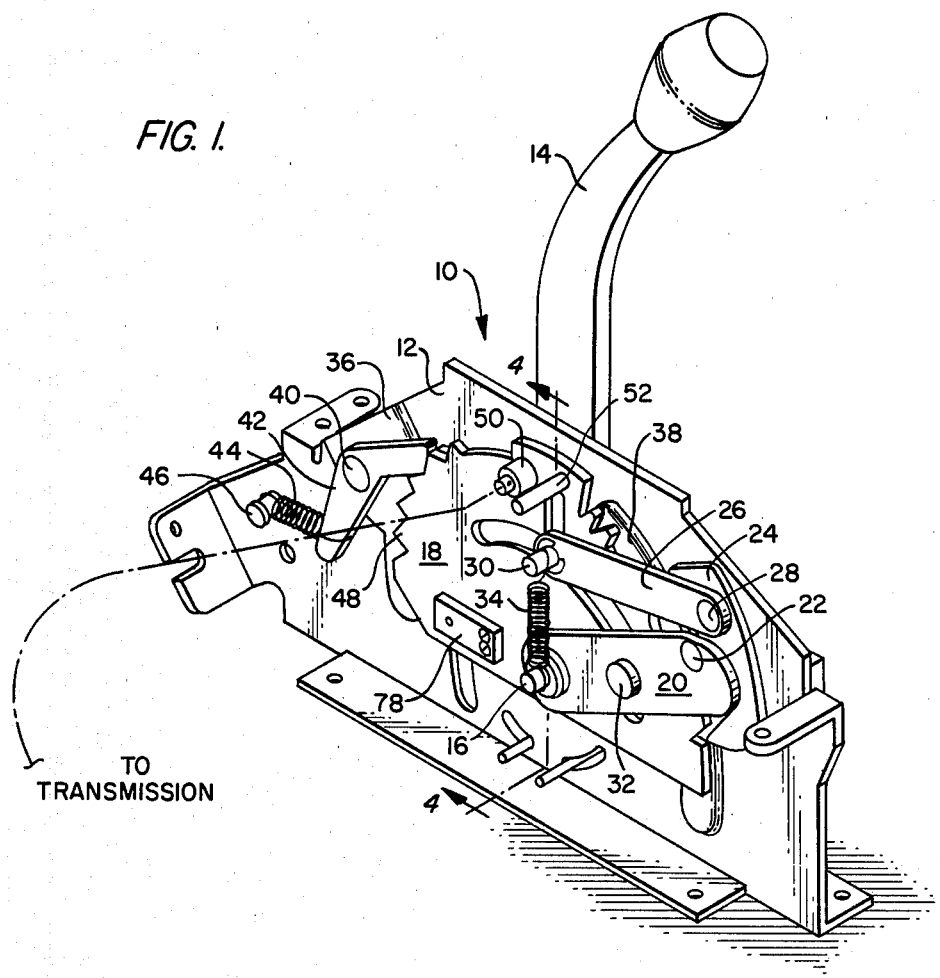
FIG. 1 is a perspective view looking from the linkage side of a shifter embodying the invention.

Referring now in detail to the drawings, there is shown a shifter 10 embodying the invention which comprises a main frame member 12 which carries a manually operable handle member 14 pivoted and slidingly mounted on a main frame fixed pivot pin 16, which pin 16 comprises one of the four pivot points of the invention linkage. Pin 16 also carries a ratchet plate 18. One end of a radius link 20 is at pivot 16, and the other end of link 20 is pivotally connected substantially centrally on a pawl member 24 at a pivot point 22. A connecting link 26 has one end pivotally connected as at 28 to the pawl 24, and its other end pivotally connected at 30 to a pin carried on the handle 14 in spaced relation to pin 16. Radius link 20 carries a pin 32 which extends through suitable slots in the main frame and in the ratchet plate 18 over to the handle side (FIG. 2), for purposes explained below.

A spring 34 is shown in FIG. 1 trained between the pin 30 and the pin 16. This is an optional feature, and is known as a reverse lockout spring. The NHRA (National Hotrod Association), a sanctioning body for racers likely to use the invention, prefers some resistance against motion of the handle towards reverse, and this spring is provided for that purpose as an option. However, it is thought that the present invention does not otherwise need the spring 34 and will operate properly without it, and thus spring 34 is deemed an optional feature.

Main frame 12 carries a left side boss portion 36 and a right side boss portion 38, right and left as viewed in FIGS. 1 and 9. These are upset portions of the body of the main frame formed while it is being stamped. These portions serve as spacing means and support surfaces for the ratchet plate 18 in the assembled shifter. That is, the portions 36 and 38 function as bearings to position and guide the plate 18 with respect to main frame 12, to thereby simplify the manufacture and assembly of shifters embodying the invention, as well as to reduce the parts required. Heretofore, separate bearing members of one sort or another would be provided for this function.

A pivot 40 on boss portion 36 carries a detent 42 which is loaded by spring 44 also trained about an anchor 46 on the main frame. The detent 42 cooperates with a first set of teeth 48 on the ratchet plate 18 to detent the plate at each of its various selected positions. Ratchet plate 18 also carries a stud or action member 50 by which a cable or link or other such means is connected to the transmission, as indicated in FIG. 1. Conventional connector means 54 cooperable with the anchor 50 is shown in dot-dash lines in FIGS. 3 and 5. A finger 52 carried on plate 18 is used as a visual indicator, as is common in automatic transmissions to show the driver at the console the gear in which the shifter has placed the transmission.

Plate 18 is formed with upper and lower ratchet teeth 56 and 58 which are separated by a cut-out 60. The cut-out 60 permits the pawl 24 to come to an inactive position when the shifter goes into gate mode, as explained below. While it appears that there are three teeth in set 58 and only two in set 56, this is only an illusion as the end surface 56A acts as a "tooth" in cooperation with the upper end of the pawl 24 when making the first shift upwardly or to the left as viewed in FIG. 9.

Figure 2:
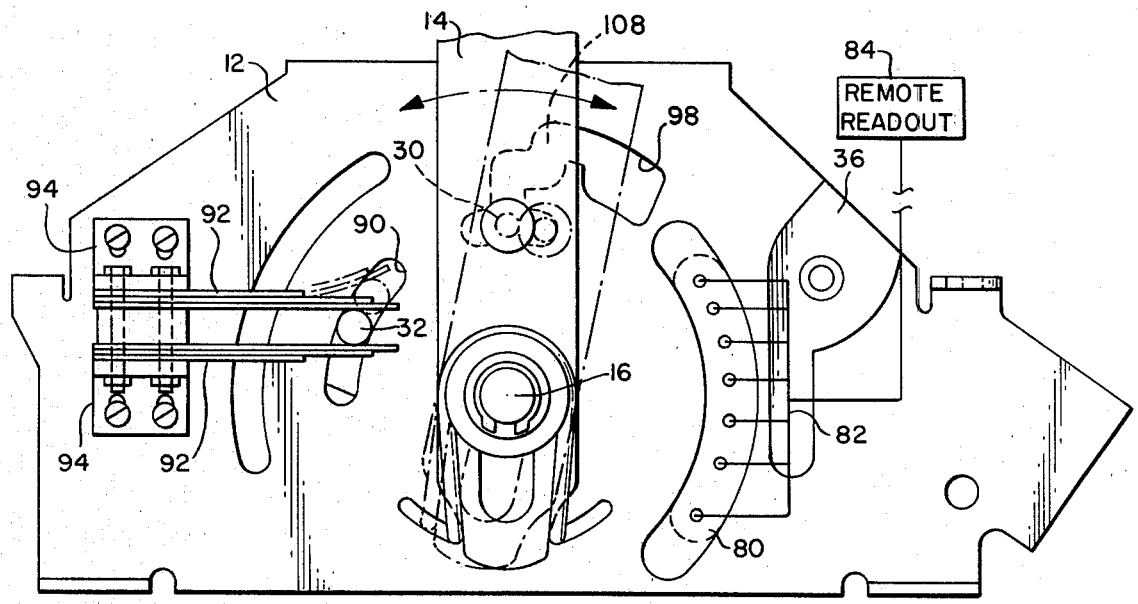
FIG. 2 is a side elevational view looking from the opposite handle side of the shifter of FIG. 1.
Figure 3:
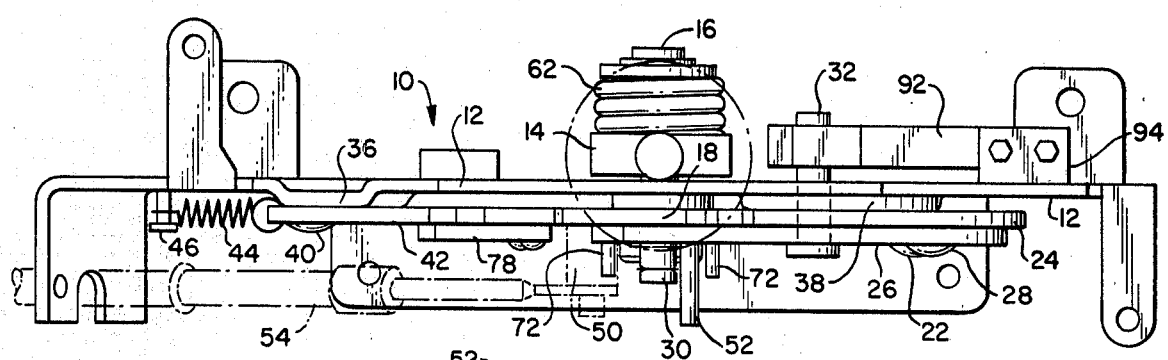
FIG. 3 is a top plan view.
Figure 4:
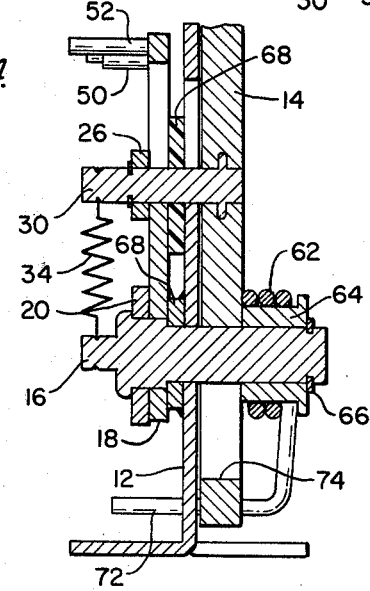
FIG. 4 is a vertical cross-sectional view taken on line 4—4 of FIG. 1 with some parts broken away and in cross-section.

Means are provided to normally bias the handle 14 to a generally upright or "home" position as shown in FIGS. 1 and 2. Referring to FIGS. 2, 3 and 4, these means comprise a relatively heavy torsion spring 62 trained about a bushing 64 held on the handle side of the pin 16 by a lock washer 66. Other washers 68, seen best in FIG. 4, are also provided around the pivot pins 16 and 30, and cooperate with the boss portions 36 and 38 to assure proper support and spacing between the main frame 12 and the ratchet plate 18.

The main frame 12 is formed with a pair of slots 70 which receive the legs 72 of the torsion spring 62. The legs 72 extend generally parallel to the axis of the pivot pin 16.

Referring to FIG. 2, a dotted line showing of the handle indicates how the legs 72 of the spring 62 bias the handle to the home position. The handle is shown rocked over to the right, which causes the left hand leg to urge the handle back to the home position.

Handle 14 is also formed with a slot 74 which receives the pin 16 to allow the handle to move vertically up and down between the gate and ratchet modes, as explained below. The spring 62 serves an additional function in conjunction with this vertical motion of the handle 14.

Figure 5:
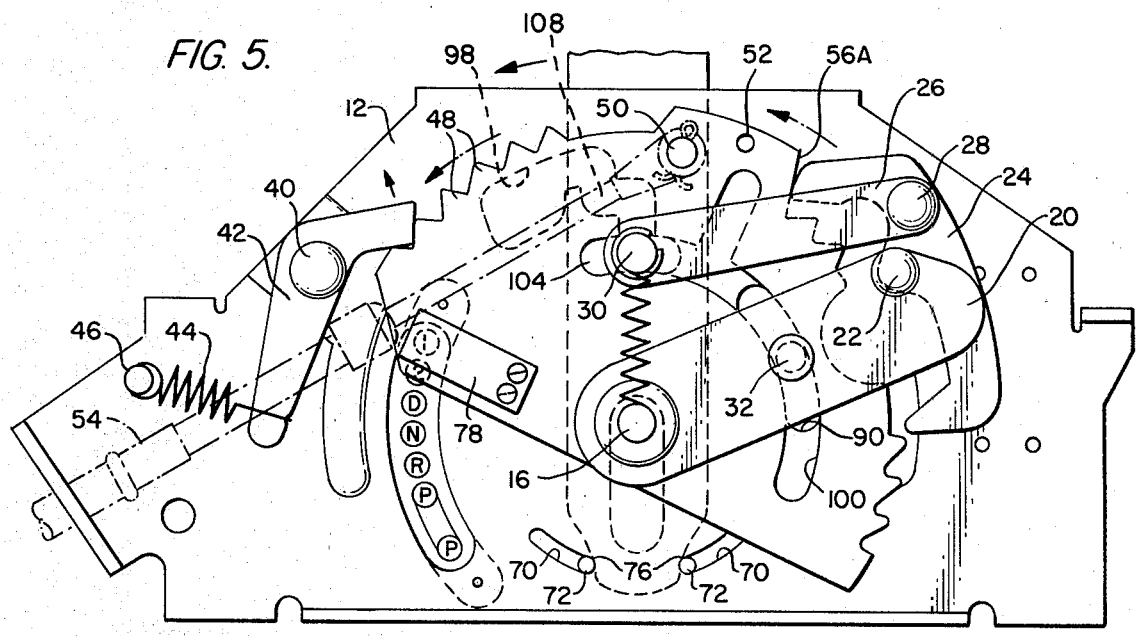

As is shown in FIGS. 2, 5 and 6, the lower end of the handle is formed into a tongue-like configuration having a pair of sloped sides 76 which bear on the legs 72 of the spring 62. This interaction between the sloped sides 76 and the spring legs 72 provides a kind of fit therebetween to better lock the handle in the down or ratchet mode position. Some of the prior art structures require two separate springs to perform these two functions performed by the one torsion spring 62 in the invention.

Another advantage resides in the fact that the invention handle has a closed lower end, whereas some prior art shifter handles are open, i.e., they have a cut-out rather than a closed slot. In the event of a harsh handle uplifting action, as can occur during the excitement of a race, a breakage of parts is possible in the prior art, whereas the overload is shared by the two pins 16 and 30 in the invention.

Means are also provided to electrically drive a remote readout of the transmission gear position as controlled by the invention shifter. These means comprise a stationary spring loaded wiper contact block 78 carried by the moving ratchet plate 18, the spring loaded contact member of which cooperates with a fixed contact block 80 carried on the main frame 12, which carries a plurality of electrical contacts, six in the commercial embodiment of the invention, which are one at a time contacted by the moving wiper contact. The electrical signals from these switch means can be used for back-up lights, reverse safety means, as well as for indicating gear position, all as is clear to those skilled in these arts. The blocks could of course be reversed or other equivalent means could be provided, all as is clear to those skilled in these arts.

A wiring harness 82 interconnects the contacts on the blocks 78 and 80 to power, ground, and any suitable remote readout means 84. The break in the wire 82 indicates that the user of the invention has complete freedom as to location for this remote readout. Further, since the two electrical blocks 78 and 80 are merely bolted in place on their respective two parts of the invention shifter, this entire feature of remote readout is an easily provided or not provided option. The holes in the plates 12 and 18 are provided in any case, but the manufacturer can opt to include or not include the two electrical parts and wiring as necessary. This gives great versatility to the invention with respect to the prior art. Referring to FIG. 9, the hole 86 for the stationary block 80 and the hole 88 for the wiper block 78 are shown.

Means are provided to load the linkage of the parts 24, 26 and 20 with respect to the teeth 56 and 58 on the ratchet plate so that the mechanism will work in proper synchronization and the pawl 24 will engage the ratchet plate teeth in the proper sequence and at the proper time during operation of the invention in its various modes, as explained in the Operation section below. To this end, the pin 32 on the radius link 20 extends through a clearance opening 90 in the main frame, and is held snugly between a pair of leaf springs 92 which are adjustably mounted on main frame 12 by means of mounting assembly 94. Assembly 94 provides an ajustment so that the pressure and location of the spring force on the pin 32 can be controlled. As indicated by the dotted line showing in FIG. 2 and as explained in regard to the rocking motion of the handle 14, the spring 92 also works together with the torsion spring 62 to normally bias the handle to its home position. However, that is incidental to the synchronization function of the leaf springs 92. The main centering function is done by the torsion spring 62. Further, the centering done by the leaf springs 92 is indirect, i.e., it must act via the pin 32 which is on the radius link 20, which in turn acts through the pawl 24 and then through the connecting link 26, to only then aid in the centering function via the pin 30 on the handle 14. Thus, this is a positive safty back-up feature.

As shown in the preferred embodiment of FIG. 2, the leaf springs 92 are built up in layers to provide a variable spring force. This gradation or increasing return force with increasing distance away from the home solid-line position of the pin 32 is required because it decreases the time for response (more force, faster action and faster shifting-time) which in practice has been demonstrated as desirable during racing. Also, the springs are used as cantilevers because this is good design practice, and it is stronger.

Figure 10:
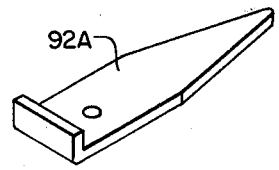
FIG. 10 is a view of yet another form of radius link spring.

An alternate form 92A of such a variable response spring is shown in FIG. 10. The increase in spring force is provided by the taper in the sides of a single thickness of spring metal rather than in built up layers of spring metal of the same general configuration. Still another form 92B of spring to accomplish this function is shown in FIG. 8 where the spring metal is tapered in the thickness rather than in the width as in FIG. 10.

The dual mode operation of the invention shifter is controlled by the pin 30 which drives the ratchet plate 18 and these two in turn control the transmission via the anchor 50. Anchor 50 can be located as necessary virtually anywhere on plate 18, as is clear to those skilled in these arts. The motion of the pin 30 is controlled by a pair of composite openings; opening 96 in the ratchet plate 18 and opening 98 in the main frame 12. Opening 96 comprises an elongated arcuate portion 100 formed about radii from the axis of the pivot pin 16 and by a vertical or radial portion 102 extending upwardly from a predetermined location in the arcuate section 100. Composite opening 98 in the main frame 12 comprises a relatively small extent arcuate portion 104 which overlies and is in registry with the arcuate portion 100 of opening 96. Opening 98 further comprises a short vertical or radial section 106 and thereafter is made up of a pair of topmost sections, 108 for reverse and 110 for park. An upstanding stop 112 separates the two section 108 and 110. These sections 108 and 110 overlie and are sometimes in registry with the vertical section 102 of composite opening 96.

OPERATION

As can be best appreciated from a simultaneous reading of the following description together with viewing of FIGS. 2, 5, 6, 7 and 9, when in ratchet mode through the drive gears and neutral, pin 30 reciprocates back and forth in the opening 104 which is then lined up with the section 104 of the main frame composite opening 98. As the gears are advanced, the elongagated arcuate section 100 of composite opening 96 advances around from position to position as the pin moves only slightly to and fro from its home position as defined by opening section 104. As is best shown in FIG. 5, the point and ratchet teeth operate just as a conventional ratchet drive to move the transmission around neutral and the forward gears.

The radial section 102 of composite opening 96 corresponds to neutral. When in neutral, pin 30 may be raised through the aligned sections 102 and 106 and then moved to the left as viewed in FIGS. 6, 7, and 9 to the reverse position defined by the opening portion 108. This raising motion changes operation over to gate mode. In order to move between reverse to park, it is necessary to lift the handle 14 to the uppermost position wherein the pin 16 will be at the bottom of the handle slot 74 to lift the pin 30 over the stop 112. Since the section 102 has no arcuate extent greater than the diameter of the pin 30, all of this motion forces the ratchet plate 18 carrying anchor 50 and thus the transmission through the three postions of neutral, reverse and park. While this is occurring, as is indicated in FIG. 7, the operating end of the pawl 24 is located in the cut-out 60 of the ratchet plate so that the ratchet action is effectively disengaged or disabled while the transmission is moved among reverse, park and neutral.

This motion of the top end of the pawl 24 into the cut-out 60 will occur because as the handle is lifted and then swung to the left, the radius link will no longer move, and thus the connecting link will pull the pawl around the pivot 22 between the radius link and the pawl urging one end of the pawl into the cut-out and the other end well away from the lower ratchet teeth 58. This condition will continue to obtain with further lifting and moving of the shifter parts between reverse and park. In effect, the ratchet linkage drops out once the handle is lifted to move the pin 30 through the radial sections 102 and 106 of the composite openings. At the same time the ratchet stays firmly connected and ready to operate as soon as the handle is lowered. This is an improvement over prior art devices where the ratchet mechanism undergoes a physical disconnection of parts when moving out of ratchet and into gate mode.

When in neutral, pawl 24 can enter cut-out 60, and at this time either gate mode or ratchet mode can be selected. This is the added versatility feature discussed above.

FIG. 5 shows the shifter in the lowest drive gear position. Further motion of the ratchet plate 18 to the right will not occur because of the pawl bearing against the surface 56A on the ratchet plate. Further, positive stops or the main frame itself, can be provided to limit ratchet plate motion.

The detent 42 under urging of the spring 44 will solidly locate the ratchet plate 18 in each of the positions, park, reverse, neutral, drive and one or two lower forward gears ratios as may be available, in that sufficient teeth 48 are provided for all of these gear positions. The invention can be easily modified for transmissions having only two forward gear ranges (drive and low), as is clear to those skilled in these arts.

The electrical remote readout means will operate in an obvious manner by co-action of the single moving wiper contact across the array of stationary contacts, as can be seen in FIGS. 5, 6 and 7.

While the invention has been described in detail above, it is to be understood that this detailed description is by way of example only, and the protection granted is to be limited only within the spirit of the invention and the scope of the following claims.

I claim:

1. A shifter for an automatic transmission comprising ratchet means operable to control said transmission through certain of its gears in a ratchet mode of operation and gate means operable to control said transmission through others of its gears in a gate mode of operation, said shifter further comprising a main frame and a handle, means to mount said handle on said main frame to permit said handle to control said ratchet means and said gate means and to move between controlling said ratchet means and said gate means, said ratchet means comprising ratchet teeth and a ratchet pawl, said ratchet pawl being mounted in link means, said link means being controlled by said handle means so that said pawl cooperates with said ratchet teeth when said shifter is operated in said ratchet mode, and said link means being operative to keep said pawl out of operative engagement with said ratchet teeth when said shifter is operated in said gate mode.

2. The combination of claim 1, said means to disable the cooperation between said ratchet pawl and said ratchet teeth comprising a clearance cut-out between said ratchet teeth, and said link means being so arranged that said pawl is moved by said link means when said shifter is in gate mode in such a way that one end of said pawl is in said cut-out while the other end of said pawl is moved well away from its cooperating ratchet teeth.

3. The combination of claim 1, said shifter comprising a ratchet plate formed with said ratchet teeth, and means interconnecting said ratchet plate and said transmission, whereby the position of said ratchet plate controls the gear selection in said transmission.

4. The combination of claim 1, said handle mounting means comprising a pivot pin mounted on said main frame and a slot formed in said handle to slidingly receive said pin, and said handle mounting means further comprising means to permit pivotal motion of said handle about said pin in all positions of said handle with respect to said pin.

5. The combination on claim 4, said shifter comprising a ratchet plate formed with said ratchet teeth, means interconnecting said ratchet plate and said transmission, whereby the position of said ratchet plate controls the gear selection in said transmission, and means to mount said ratchet plate on said pivot pin on said main frame.

6. The combination on claim 1, wherein the transmission gears controlled in said gate mode include reverse and park, and spring means biasing said handle normally towards said ratchet mode of operation.

7. The combination of claim 1, said shifter comprising electrical switch means, said switch means comprising a single wiper electrical contact member on one of said main frame and a moving member in said shifter, said switch means further comprising a multi-electrical contact block on the other of said main frame and said moving member, and said wiper contact and said contact block being operatively cooperable to provide an electrical signal indicative of the gear position of the transmission being controlled by said shifter, whereby said switch means comprise a built-in electrical drive for a remote readout or the like.

8. The combination of claim 1, said handle mounting means comprising a pivot pin mounted in said main frame, said handle being mounted on said pivot pin for at least pivotal motion thereon, said link means comprising a radius link extending from said pivot pin to a first location on said pawl and being pivotally connected to said pawl thereat, a connecting link pivotally connected at one end to said handle at a position thereon in spaced predetermined relation to said handle pivot pin and the other end of said connecting link being pivotally connected to said pawl at a position thereon in predetermined spaced relation to said pivotal connection between said pawl and said radius link, whereby said pawl "floats" on said connecting link and said radius link while said handle is always connected to said pawl via said handle pivot pin and said pivot to said connecting link.

9. The combination of claim 8, and variable response spring means for biasing said link means to keep said ratchet teeth and said pawl synchronized in said ratchet mode of operation, a pin on said radius link, said pin extending through a guide opening in said main frame for cooperation with said variable response spring means, and said variable response spring means comprising a pair of leaf springs adjustably positioned on said main frame one on either side of said radius link pin.

10. The combination of claim 3, and spacing and bearing means between said main frame and said ratchet plate, said bearing and spacing means comprising boss portions formed in said main plate and extending out from the plane thereof to the plane of said ratchet plate.

11. The combination of claim 1, and spring means for normally biasing said handle to a home position when said handle is operated in its ratchet mode, said handle mounting means comprising a pivot pin mounted in said main frame, said handle being mounted on said pivot pin for at least pivotal motion thereon, said link means and said spring means comprising a torsion spring coiled about said pivot pin, said torsion spring comprising a pair of end legs extending through guide opendings in said main frame and cooperating with an outer end portion of said handle, whereby one or the other of the legs of said torsion spring is contacted by said handle when said handle is rocked to or fro away from said home position.

12. The combination of claim 11, and means to permit said handle to disengage said torsion spring when said handle is moved away from said ratchet mode of operation into said gate mode of operation.

13. The combination of claim 12, said means to permit comprising a slot formed in said handle to slidingly receive said pin and to permit pivotal motion of said handle about said pin in all positions of said handle with respect to said pin.

14. The combination of claim 1, and variable response spring means for biasing said link means to keep said ratchet means synchronized in said ratchet mode of operation.

15. The combination of claim 14, said spring means comprising a layered leaf spring.

16. The combination of claim 14, said spring means comprising a leaf spring member tapered in its thickness.

17. The combination of claim 14, said spring means comprising a leaf spring member tapered in its width.

18. The combination of claim 1, said ratchet means comprising a ratchet plate formed with said ratchet teeth, said link means comprising a pin provided between said handle and one of the links in said link means in spaced relation on said handle to said means mounting said handle on said main frame, said ratchet plate and said main frame each being formed with a composite slot, said composite slots overlying each other and receiving said pin between said handle and said one of said links, and the relative positions of said two slots and said pin all to each other defining said ratchet and said gate modes of operation and the particular gear position in which said shifter will place said transmission.

19. The combination of claim 18, said handle mounting means comprising a pivot pin mounted on said main frame and a slot formed in said handle to slidingly receive said pin and to permit pivotal motion of said handle about said pin in all positions of said handle with respect to said pin.

20. The combination of claim 19, said two slots comprising overlying vertical slot portions which cooperate with said pin and with each other to control said gate mode of operation and comprising overlying arcuate slot portions which cooperate with each other and with said pin to control said ratchet mode of operation, and the aligned position of said vertical slot portions corresponding to the neutral position of said shifter and of said transmission to permit radial motion of said pin therethrough to accomplish changes of mode of operation.

21. The combination of claim 19, each of said slots comprising a generally radially disposed slot portion, the aligned position of said radial slot portions corresponding to the neutral gear position of said transmission, said main frame comprising reverse and park slot portions extending from the radial outermost portion of said vertical slot portion in said main frame, the vertical slot portion in said ratchet plate extending radially outwardly sufficiently to overlie said reverse and park slot portions, the arcuate width of both of said vertical slot portions being substantially equal to the diameter of said pin, whereby motion of said pin in said reverse and park slot portions will move said ratchet plate via said ratchet plate vertical slot portion while said pawl is disabled while said shifter is thereby moved to its gate mode of operation.

22. The combination of claim 19, each of said ratchet plate and main frame slots comprising an arcuate portion which at least partially overlies each other in all gear positions in the ratchet mode of operation of said shifter, said arcuate slot portion in said main frame having an arcuate length corresponding to the total distance of the to and fro rocking motion of said handle so that said main frame arcuate slot portion defines the limits of said handle rocking motion, and said ratchet plate arcuate slot portion having a relatively longer arcuate length sufficient to permit said ratchet teeth and pawl to control the motion of said ratchet plate in said ratchet mode of operation.

23. A shifter for an automatic transmission having a ratchet mode and a gate mode of operation, the combination comprising a main frame, a handle, means to mount said handle on said main frame for motion with respect thereto; a three member four pivot linkage interconnecting said handle, said main frame and the ratchet pawl used in said ratchet mode of operation, said linkage including said pawl as one of the three members of said linkage; a ratchet plate having ratchet teeth for cooperation with said ratchet pawl, said linkage comprising a radius link extending from the mounting means between said handle and said main frame to a first location on said pawl and being pivotally connected to said pawl thereat, a connecting link pivotally connected at one end to said pawl at a position thereon in a predetermined spaced relation to said pivotal connection between said pawl and said radius link, and means to disable the cooperation between said ratchet pawl and said ratchet teeth when said handle is moved from said ratchet mode of operation to said gate mode of operation, whereby said pawl floats on said connecting link and said radius link while said handle is always connected to said linkage via said pivot to said connecting link.

24. The combination of claim 23, said means to disable the cooperation between said ratchet pawl and said ratchet teeth comprising a cut-out between the ratchet teeth on said ratchet plate, and said linkage being so arranged that said pawl is moved by said linkage when said shifter is in gate mode in such a way that one end of said pawl is in said cut-out while the other end of said pawl is moved well away from its cooperating ratchet teeth on said ratchet plate.

25. The combination of claim 23, and spring means for normally biasing said handle to a home position when said handle is operating in its ratchet mode, said spring means comprising a torsion spring coiled about a pivot pin in said mounting means between said handle and said main frame, said torsion spring comprising legs cooperating with a portion of said handle so that one or the other of said legs of said torsion spring is contacted by said handle when said handle is rocked to or fro away from said home position.

26. The combination of claim 25, said torsion spring being located on the side of said main frame opposite said handle, and said main frame being formed with arcuate guide openings receiving said legs of said torsion spring.

27. The combination of claim 25, and means to permit said handle to disengage said torsion spring when said handle is moved from said ratchet mode of operation into said gate mode of operation.

28. The combination of claim 27, said means to permit said handle to disengage said torsion spring comprising a slot formed in said handle to slidingly receive said pin and to permit pivotal motion of said handle about said pin in all positions of said handle with respect to said pin.

29. The combination of claim 23, and bearing and spacing means between said main frame and said ratchet plate, said bearing and spacing means comprising boss portions formed in said main plate and extending out from the plane thereof to the plane of said ratchet plate.

30. The combination of claim 23, said shifter comprising electrical switch means, said switch means comprising a single wiper electrical contact member on one of said main frame and said ratchet plate, said switch means further comprising a multi-electrical contact block on the other of said main frame and said ratchet plate, and said wiper contact and said contact block being operatively cooperable to provide an electrical signal indicative of the gear position of the transmission being controlled by said shifter, whereby said switch means comprise a built-in electrical drive for a remote readout or the like.

31. The combination of claim 23, the fourth pivot of said linkage comprising a pin between said handle and the other end of said connecting link in spaced relation on said handle to said means mounting said handle on said main frame, said ratchet plate and said main frame each being formed with a composite slot, said composite slots overlying each other and receiving said pin between said handle and said connecting link, and the relative positions of said two slots and said pin all to each other defining said ratchet and said gate modes of operation and the particular gear position in which said shifter will place said transmission.

32. The combination of claim 31, said handle mounting means comprising a pivot pin mounted on said main frame and a slot formed in said handle to slidingly receive said pin and to permit pivotal motion of said handle about said pin in all positions of said handle with respect to said pin.

33. The combination of claim 32, said two slots comprising overlying vertical slot portions which cooperate with said pin and with each other to control said gate mode of operation and comprising overlying arcuate slot portions which cooperate with each other and with said pin to control said ratchet mode of operation, and the aligned position of said vertical slot portions corresponding to the neutral position of said shifter and of said transmission to permit radial motion of said pin therethrough to accomplish changes of mode of operation.

34. The combination of claim 32, each of said ratchet plate and main frame slots comprising an arcuate portion which at least partially overlies each other in all gear positions in the ratchet mode of operation of said shifter, said arcuate slot portion in said main frame having an arcuate length corresponding to the total distance of the to and fro rocking motion of said handle so that said main frame arcuate slot portion defines the limits of said handle rocking motion, and said ratchet plate arcuate slot portion having a relatively longer arcuate length sufficient to permit said ratchet teeth and pawl to control the motion of said ratchet plate in said ratchet mode of operation.

35. The combination of claim 32, each of said slots comprising a generally radially disposed slot portion, the aligned position of said radial slot portions corresponding to the neutral gear position of said transmission, said main frame comprising reverse and park slot portions extending from the radial outermost portion of said vertical slot portion in said main frame, the vertical slot portion in said ratchet plate extending radially outwardly sufficiently to overlie said reverse and park slot portions, the arcuate width of both of said vertical slot portions being substantially equal to the diameter of said pin, whereby motion of said pin in said reverse and park slot portions will move said ratchet plate via said ratchet plate vertical slot portion while said pawl is disabled while said shifter is thereby moved to its gate mode of operation.

36. The combination of claim 23, and variable response spring means for biasing said linkage to keep said ratchet plate and said pawl synchronized in said ratchet mode of operation.

37. The combination of claim 36, a pin on said radius link, said pin extending through a guide opening in said main frame for cooperation with said variable response spring means, and said variable response spring means comprising a pair of leaf springs adjustably positioned on said main frame one on either side of said radius link pin.

38. The combination of claim 36, said spring means comprising a leaf spring member tapered in its width.

39. The combination of claim 36, said spring means comprising a leaf spring member tapered in its thickness.

40. The combination of claim 36, said spring means comprising a layered leaf spring.

41. The combination of claim 23, and means interconnecting said ratchet plate and said transmission, whereby the position of said ratchet plate controls the gear selection in said transmission.

42. The combination of claim 23, said handle mounting means comprising a pivot pin mounted on said main frame and a slot formed in said handle to slidingly receive said pin, and said handle mounting means further comprising means to permit pivotal motion of said handle about said pin in all positions of said handle with respect to said pin.

43. The combination on claim 42, and means to mount said ratchet plate on said pivot pin on said main frame.

44. The combination on claim 23, wherein the transmission gears controlled in said gate mode include reverse and park, and spring means biasing said handle normally towards said ratchet mode of operation.

* * * * *